(12) United States Patent
Durrant (10) Patent No.: US 10,226,030 B2
(45) Date of Patent: Mar. 12, 2019

(54) ANIMAL TRAINING SYSTEM

(71) Applicant: Christine Durrant, Martinez, CA (US)

(72) Inventor: Christine Durrant, Martinez, CA (US)

( * ) Notice: Subject to any disclaimer, the term of this patent is extended or adjusted under 35 U.S.C. 154(b) by 0 days.

(21) Appl. No.: 14/673,568

(22) Filed: Mar. 30, 2015

(65) Prior Publication Data

US 2016/0286763 A1    Oct. 6, 2016

(51) Int. Cl.
*A01K 27/00*    (2006.01)

(52) U.S. Cl.
CPC ................... *A01K 27/001* (2013.01)

(58) Field of Classification Search
CPC .... A01K 27/00; A01K 27/002; A01K 27/001; A01K 27/003; A01K 27/004; A01K 27/005
USPC ....... 119/863, 856, 857, 858, 865, 769, 770, 119/792, 793, 795, 797, 798
See application file for complete search history.

(56) References Cited

U.S. PATENT DOCUMENTS

| | | | | |
|---|---|---|---|---|
| 5,842,444 A * | 12/1998 | Perrulli | ................ | A01K 27/003 119/770 |
| 5,950,569 A * | 9/1999 | Perrulli | ................. | A01K 27/00 119/770 |
| 6,932,027 B1 * | 8/2005 | Whitney | ................ | A01K 27/00 119/770 |
| 7,467,604 B1 * | 12/2008 | Werner | .................. | A01K 27/00 119/770 |
| 2005/0229867 A1 * | 10/2005 | Green | .................... | A01K 27/00 119/770 |
| 2013/0255594 A1 * | 10/2013 | Moon | .................. | A01K 27/009 119/863 |

OTHER PUBLICATIONS www.amazon.com/LupinePet-Basics-Adjustable-Collar-Medium/dp/B001PNIAEO/ref=sr_1_3?ie=UTF8&qid=1509579131&sr=8-3&keywords=basic+dog+collar, Nov. 5, 2010, Amazon.com.
www.amazon.com/Coastal-Pet-Products-DCP330218BLK-18-Inch/dp/B00BUFTKBE/ref=cm_cr_arp_d_product_top?ie=UTF8, Feb. 8, 2011, Amazon.com.

* cited by examiner

*Primary Examiner* — Trinh T Nguyen
(74) *Attorney, Agent, or Firm* — West & Associates, A PC; Stuart West (57) ABSTRACT

A collar with a cinch strap that can be at least partially pulled away from the collar's main strap, such that the cinch strap can be pulled for a distance before pulling or tightening forces are applied to an animal's neck through the main strap. The collar also has a band under the main strap that is wider than the main strap, such that any pulling or tightening forces applied to the main strap are dispersed over a wider area than the main strap to minimize discomfort in an animal wearing the strap.

10 Claims, 6 Drawing Sheets

ANIMAL TRAINING SYSTEM

BACKGROUND

Field of the Invention

The present disclosure relates to animal training systems, particularly an animal training system with a collar having a cinch strap that can connect to a leash.

Background

Collars and harnesses are often used when training a dog or other animal. A handler can use a collar or harness to control the animal's movements and thereby direct or train the animal. Training can be done to teach new behaviors to an animal, and/or encourage the animal to stop harmful or undesirable behaviors. For instance, collars or harnesses are often used when training a dog to stop pulling on a leash.

While collars or harnesses are commonly used when training animals, many conventional types of collars and harnesses cause animals to experience discomfort and/or pain during training. Some types of collars, such as metal prong or choke collars, are specifically intended to use discomfort to teach animals not to perform certain behaviors. This practice has become controversial, with many considering it to be inhumane. It also can produce confusion or aggression in the animal instead of teaching the animal. Other collars, such as standard flat collars, can put uncomfortable pressure on an animal's neck when the animal attempts to move away from a trainer.

Other types of collars and harnesses have other drawbacks. Martingale collars can be difficult to pass over an animal's head, and then must be re-adjusted on the animal's neck, which can be time-consuming. In some cases the time-consuming process of putting on and taking off tightening training collars, such as Martingale collars, leads people to leave a training collar on their animal at all times. This can be a dangerous choking risk because such collars can tighten when accidentally caught on something during everyday use. Harnesses can also be difficult and/or time-consuming to fasten around an animal's head, and in some cases can provide the animal with more leverage to pull a trainer around instead of giving the trainer more control over the animal.

What is needed is a collar with a cinch strap that can be at least partially pulled away from the collar's main strap, such that the cinch strap can be pulled for a distance before pulling or tightening forces are applied to an animal's neck through the main strap. The collar should also have a band under the main strap that is wider than the main strap, such that any pulling or tightening forces applied to the main strap are dispersed over a wider area than the main strap to minimize discomfort in an animal wearing the strap.

DETAILED DESCRIPTION

Figure 1:
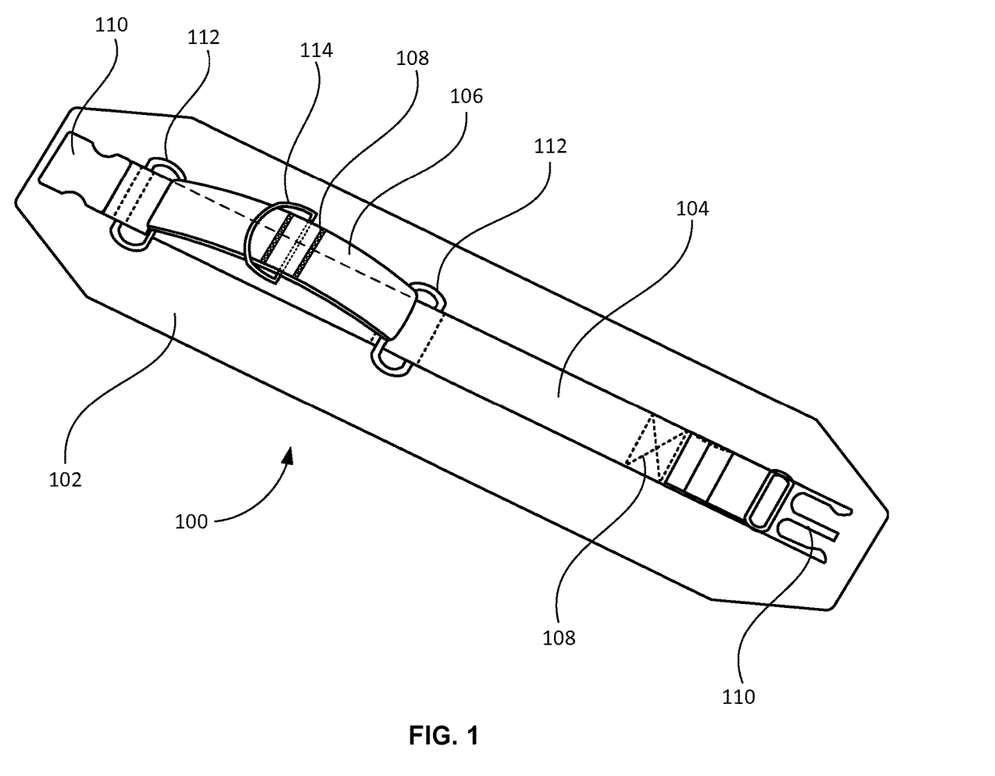
FIG. 1 depicts an exemplary embodiment of a collar.

FIG. 1 depicts a collar 100 comprising a collar band 102, a collar strap 104, and a cinch strap 106. The collar 100 can be worn around an animal's neck and can provide an animal trainer or other handler with handholds and/or attachments for leashes or other equipment to assist in controlling the animal's movements and/or training the animal. By way of a non-limiting example, the collar 100 can be worn around a dog's neck.

A collar band 102 can be a flexible and substantially planar member shaped with dimensions such that the collar band 102 can be looped and secured around an animal's neck. In some embodiments, opposing ends of the collar band 102 can be tapered as shown in FIG. 1. In other embodiments, opposing ends of the collar band 102 can be flat, pointed, curved, and/or have any other shape. The collar band 102 can comprise an at least partially flexible material, such as webbing, cotton, canvas, leather, and/or any other flexible material. In some embodiments the collar band 102 can be a single layer of material. In other embodiments the collar band 102 can have an outer layer of material at least partially surrounding padding and/or an inner material such as flannel, fleece, neoprene, foam or any other type of material.

A collar strap 104 can be an elongated member coupled with a collar band 102, such that the collar strap 104 extends at least partially along the length of the collar band 102. In some embodiments, the collar strap 104 can be a strap or rope comprising nylon, polypropylene, cotton, elastic, leather, and/or any other type of material. In other embodiments the collar strap 104 can be a chain made of metal, plastic, or any other material.

In some embodiments, the collar strap 104 can be sewn to the collar band 102 at one or more locations. By way of a non-limiting example, stitching 108 can couple the collar band 102 with the collar strap 104 proximate to an end of the collar strap 104, as shown in FIG. 1. In other embodiments, the collar strap 104 can be permanently or temporarily affixed to the collar band 102 with rivets, buttons, snaps, hook and loop fasteners, adhesives, bolts, or any other coupling mechanism. In still other embodiments, the collar strap 104 can pass through one or more loops extending from the collar band 102.

In some embodiments connectors 110 can be coupled with one or more ends of the collar strap 104, such that opposing ends of the collar strap 104 can be selectively coupled together so that the collar strap 104 forms a loop. In some embodiments the connectors 110 can be buckles, and one buckle can be coupled with one end of the collar strap 104 and another buckle can be coupled with the other end of the collar strap 104. By way of a non-limiting example, FIG. 1 depicts one connector 110 as a male side release buckle and the other connector 110 as a female side release buckle configured to releasably receive the male side release buckle. In other embodiments, connectors can be clasps, snaps, zippers, buttons, interlocking components, elongated members that can be tied together, or any other connector or fastener. In alternate embodiments the connectors 110 can be absent, and the collar band 102 and/or collar strap 104 can be formed as closed loops.

In some embodiments, the collar strap 104 and/or one or more connectors 110 can have an adjustable length, such that the overall length of the collar 100 can be adjusted. By way of a non-limiting example, a connector 110 can be coupled with a portion of the collar strap 104 that is not secured to the collar band 102 so that the length of the unsecured portion can be adjusted, as shown in FIG. 1. By way of another non-limiting example, a connector 110 can have its own strap or other component with an adjustable length, with one end of connector's adjustable portion coupled with an end of the collar strap 104.

Two anchor rings 112 can be secured at different positions on the collar strap 104. Each anchor ring 112 can be a D-ring, an O-ring, or any other type of ring. In some embodiments the collar strap 104 can pass through the anchor rings 112 and be sewn or otherwise secured to itself or the underlying collar band 102 to secure the anchor rings 112 in place on the collar 100. In some embodiments one anchor ring 112 can be secured on the collar strap 104 proximate to an end of the collar strap 104 while a second anchor ring 112 can be secured on the collar strap at a location between the collar strap's ends, as shown in FIG. 1. In other embodiments the anchor rings 112 can be secured to any other desired positions on the collar strap 104.

A cinch strap 106 can be an elongated member secured between the anchor rings 112. In some embodiments, the cinch strap 106 can be a strap or rope comprising nylon, polypropylene, cotton, elastic, leather, and/or any other type of material. In other embodiments the cinch strap 106 can be a chain made of metal, plastic, or any other material. In some embodiments, the cinch strap 106 can comprise flexible but resilient material such as foam, plastic, or elastomer, or have an internal spring or other resilient member, such that the cinch strap 106 can flex when force is applied to it but return to its original shape when that force is removed.

In some embodiments, cinch strap 106 can be fed through the anchor rings 112 and secured to itself using stitching, adhesives, rivets, bolts, and/or any other coupling mechanism. In other embodiments the cinch strap 106 can be a loop that passes through the anchor rings 112.

In some embodiments, a leash connector 114 can be coupled with the cinch strap 106. In some embodiments, the leash connector 114 can be a ring, such as a D-ring, O-ring, or any other type of ring to which a leash can be connected. In other embodiments, the leash connector 114 can be a buckle, hook, hole in the cinch strap 106, or any other type of connector to which a leash can be connected. In alternate embodiments the leash connector 114 can be absent, and a leash can be looped directly around the cinch strap 106 between the anchor rings 112.

In some embodiments, the leash connector 114 can be secured to a position on the cinch strap 106. By way of a non-limiting example in some embodiments the cinch strap 106 can have two layers of material with a portion of the leash connector 114 passing between the two layers, and the two layers can be sewn together with stitching 108 on either side of the leash connector 114 to keep the leash connector 114 in place. In other embodiments, the leash connector 114 can pass through a hole in the cinch strap 106, be secured to the cinch strap 106 with rivets, bolts, screws, or any other coupling mechanism, or be otherwise secured to the cinch strap 106. In alternate embodiments, the cinch strap 106 can pass through a hole in the leash connector 114, or the leash connector 114 can be tied around the cinch strap 106, such that the leash connector 114 can slide along the cinch strap 106 to any position between the anchor rings 112.

In some embodiments, the collar 100 can be manufactured in different sizes to fit animals of different sizes. By way of a non-limiting example, a collar 100 with a collar band 102 having a width of 1 inch and a length of 10 inches can be available to fit smaller animals, while a collar 100 with a collar band 102 having a width of 3 inches and a length of 20 inches can be available to fit larger animals. In other embodiments, the collar 100 can have dimensions of any other desired size and/or have dimensions that can be adjusted to fit an animal of any size.

Figure 2:
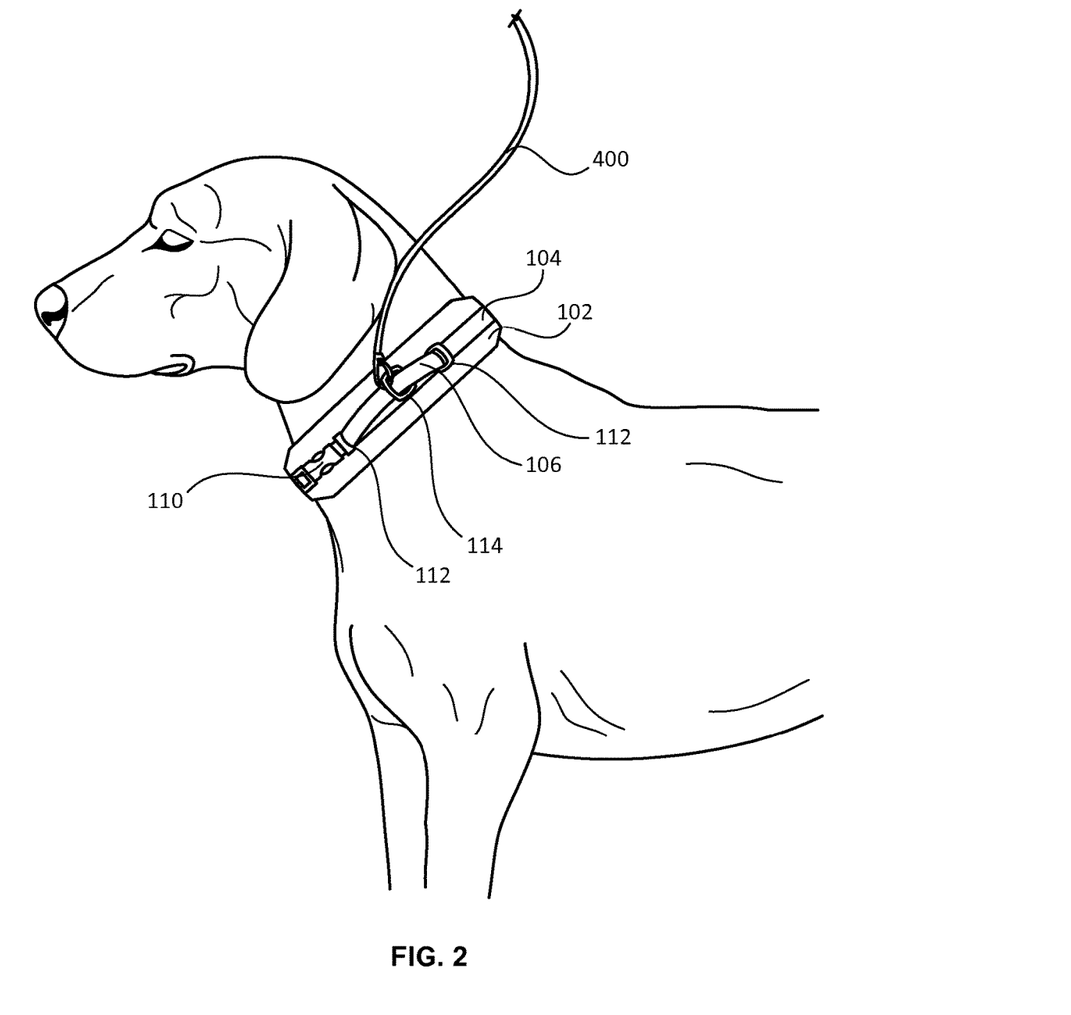
FIG. 2 depicts an embodiment of a collar worn around an animal's neck.

FIG. 2 depicts the collar 100 being worn around a dog's neck. In use, the collar 100 can be looped around an animal's neck, and the connectors 110 can be fastened together such that the collar band 102 and collar strap 104 completely encircle the animal's neck. The connectors 110 and/or collar strap 104 can be adjusted so that the collar 100 snugly fits around the animal's neck. In alternate embodiments in which the collar band 102 and/or collar strap 104 are formed as closed loops without connectors 110, the collar 100 can be passed over the animal's head so that the collar 100 can be positioned and/or tightened around the animal's neck.

Figure 3A:
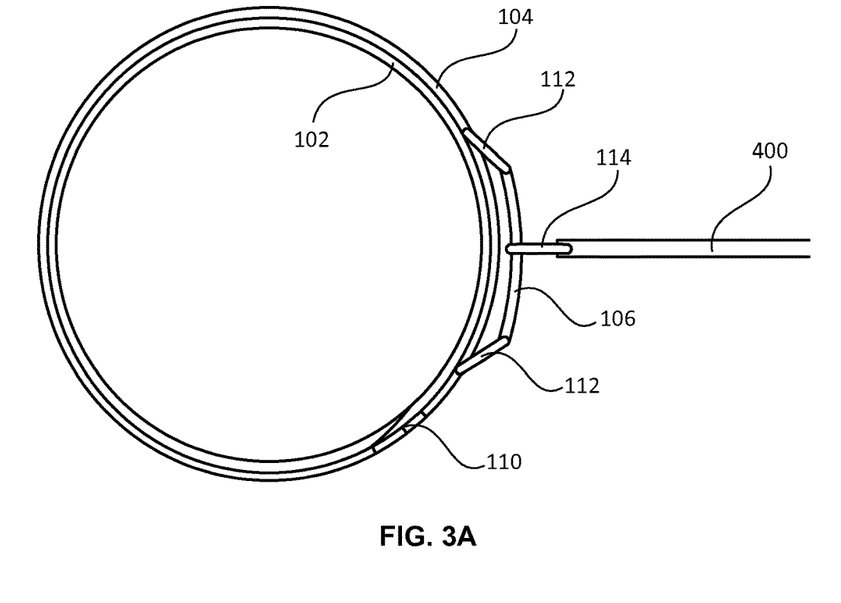
FIG. 3A depicts an embodiment of a collar not being pulled.
Figure 3B:
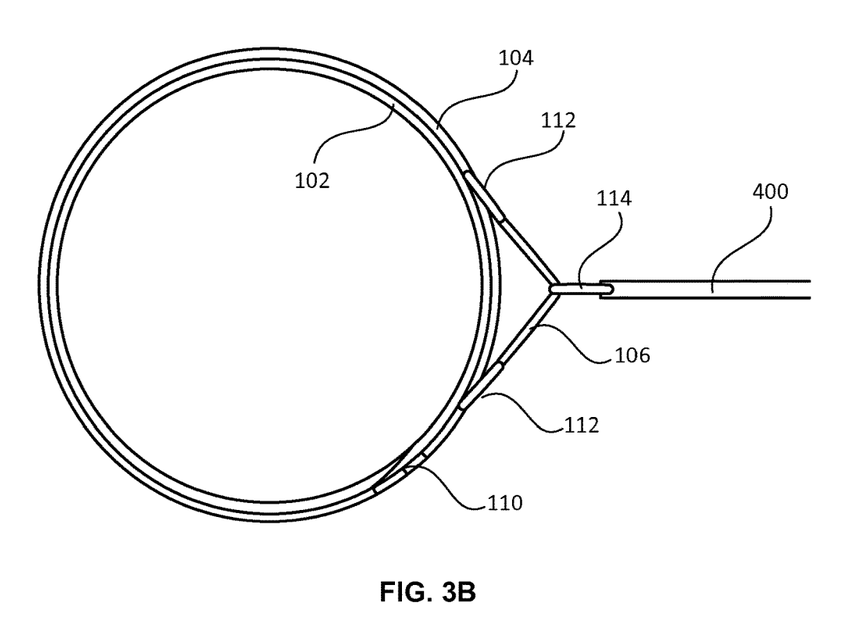
FIG. 3B depicts an embodiment of a collar being pulled.

As shown in FIG. 2 and FIGS. 3A-3B, a leash can be coupled with the leash connector 114 on the cinch strap 106. In some embodiments the leash 400 described below can be coupled with the collar 100, although in other embodiments any other type of leash can be used. As shown in FIGS. 3A-3B when the leash connector 114 and/or cinch strap 106 is pulled, the cinch strap 106 can flex and be partially pulled away from the collar strap 104 without significantly tightening the collar strap 104 around the animal's neck.

In use, the movement of cinch strap 106 can provide a trainer or other animal handler with leeway to pull a leash connected to the cinch strap 106 without tightening the collar 100 around the animal's neck and producing discomfort in the animal. After the cinch strap 106 has been pulled to a maximum distance, any further pulling on the cinch strap 106 can in turn pull the collar strap 104 and put pressure on the animal's neck. However, the presence of the wider collar band 102 between the collar strap 104 and the animal's neck can disperse that pressure over a wider area than the collar strap 104 alone and thereby minimize the animal's discomfort.

Figure 4:
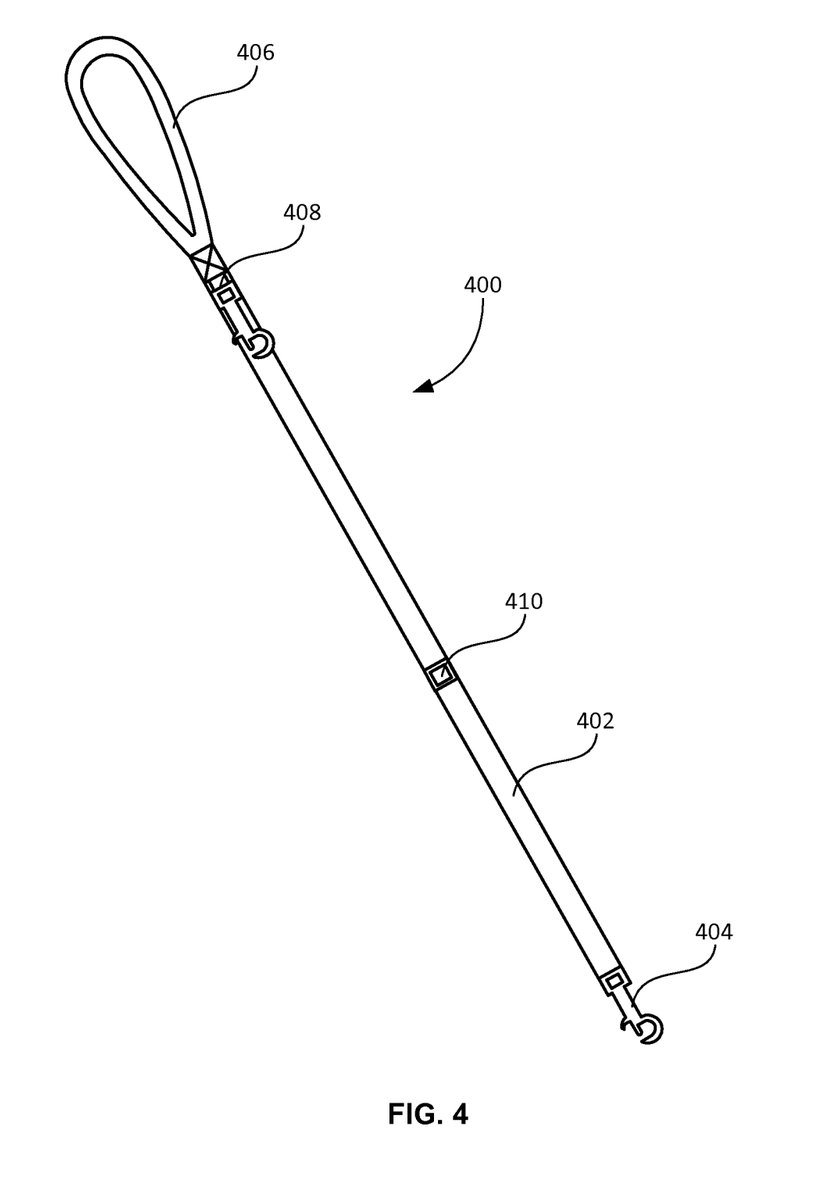
FIG. 4 depicts an exemplary embodiment of a leash.

FIG. 4 depicts an exemplary embodiment of a leash 400 that can be used in conjunction with the collar 100 and/or a waist belt 500. The leash 400 can have a leash strap 402, a collar connector 404, and a handle 406. In some embodiments, the leash strap 402 can be a strap or rope comprising nylon, polypropylene, cotton, elastic, leather, and/or any other type of material. In other embodiments the leash strap 402 can be a chain made of metal, plastic, or any other material.

A collar connector 404 can be coupled with one end of the leash strap 402. A collar connector 404 can be a latch, hook, buckle, or any other type of connector configured to be secured to the collar's leash connector 114 and/or cinch strap 106. By way of a non-limiting example, the collar connector 404 can be a spring hook, as shown in FIG. 4. In some embodiments, the collar connector 404 can swivel or rotate relative to the end of the leash strap 402, while in other embodiments the collar connector 404 can be fixed relative to the end of the leash strap 402. In alternate embodiments the collar connector 404 can be absent, and an end of the leash strap 402 can be tied or be otherwise secured to the leash connector 114 and/or cinch strap 106.

A handle 406 can be coupled with the end of the leash strap 402 opposite to the collar connector 404. In some embodiments the handle 406 can be shaped and/or have components configured to be gripped by a user, such as an opening and/or textured grips. In some embodiments the handle 406 can be a separate component permanently or detachably coupled with the leash strap 402 with a handle connector 408. A handle connector 408 can be one or more latches, hooks, buckles, or any other type of connector configured to be couple the handle 406 with the leash strap 402, and/or couple the leash 400 with the collar 100 or waist belt 500. By way of a non-limiting example, the handle connector 408 can be a spring hook, as shown in FIG. 4. In some embodiments, the handle connector 408 can swivel or rotate relative to the end of the leash strap 402, while in other embodiments the handle connector 408 can be fixed relative to the end of the leash strap 402. In alternate embodiments the handle 406 can be integral with the rest of the leash strap 402, and/or the handle connector 408 can hang off the leash 400.

In some embodiments the length of the leash 400 can be adjustable. By way of a non-limiting example, an adjustable slider 410 can be present on the leash strap 402 that is configured to adjust the length of the leash strap 402 when moved. In alternate embodiments, the length of the leash 400 can be fixed.

Figure 5:
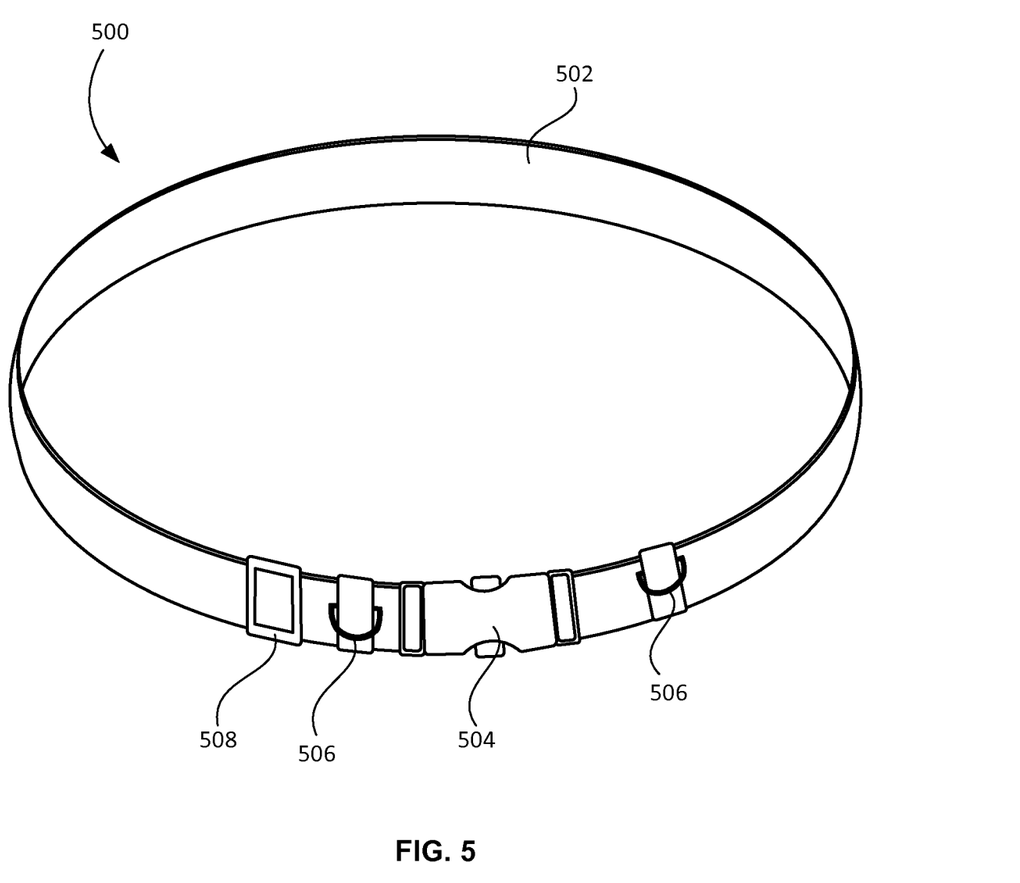
FIG. 5 depicts an exemplary embodiment of a waist strap.

FIG. 5 depicts an exemplary embodiment of a waist belt 500 that can be used in conjunction with the collar 100 and/or the leash 400. The waist belt 500 can have a waist strap 502, one or more belt connectors 504, and one or more attachment members 506. The waist strap 502 can be an elongated member with a length that can encircle a user's waist. In some embodiments, the waist strap 502 can be a strap or rope comprising nylon, polypropylene, cotton, elastic, leather, and/or any other type of material. In other embodiments the waist strap 502 can be a chain made of metal, plastic, or any other material.

One or more belt connectors 504 can be coupled with the waist strap 502, such that the belt connectors 504 can be coupled to secure the waist strap 502 around a user's waist. Belt connectors 504 can be buckles, connectors can be clasps, snaps, zippers, buttons, interlocking components, elongated members that can be tied together, or any other connector or fastener. By way of a non-limiting example, FIG. 1 depicts one belt connector 504 as a male side release buckle and the other belt connector 504 as a female side release buckle configured to releasably receive the male side release buckle. By way of another non-limiting example, the belt connectors 504 can be a belt buckle configured to interact with one or more holes in the waist strap 502. In some embodiments, the waist strap 502 can have a length adjustor 508, such as a slider, configured to adjust the length of the waist strap 502.

One or more attachment members 506 can be coupled with the waist strap 502. The attachment members 506 can be configured to attach to another component. By way of non-limiting examples, the attachment members 506 can be used to connect the handle connector 408 of the leash 400 to the waist belt 500, attach keys or tools to the waist belt, and/or connect any other desired item to the waist belt. Attachment members 506 can be rings such as D-rings, O-rings, or any other type of ring, loops, hooks, latches, and/or any other component. By way of a non-limiting example, FIG. 5 depicts an embodiment in which the attachment members 506 are D-rings hanging from loops extending out of the waist strap 502. In some embodiments the waist belt 500 can have a single attachment member 506, while in other embodiments the waist belt 500 can have a plurality of attachment members 506.

Figure 6:
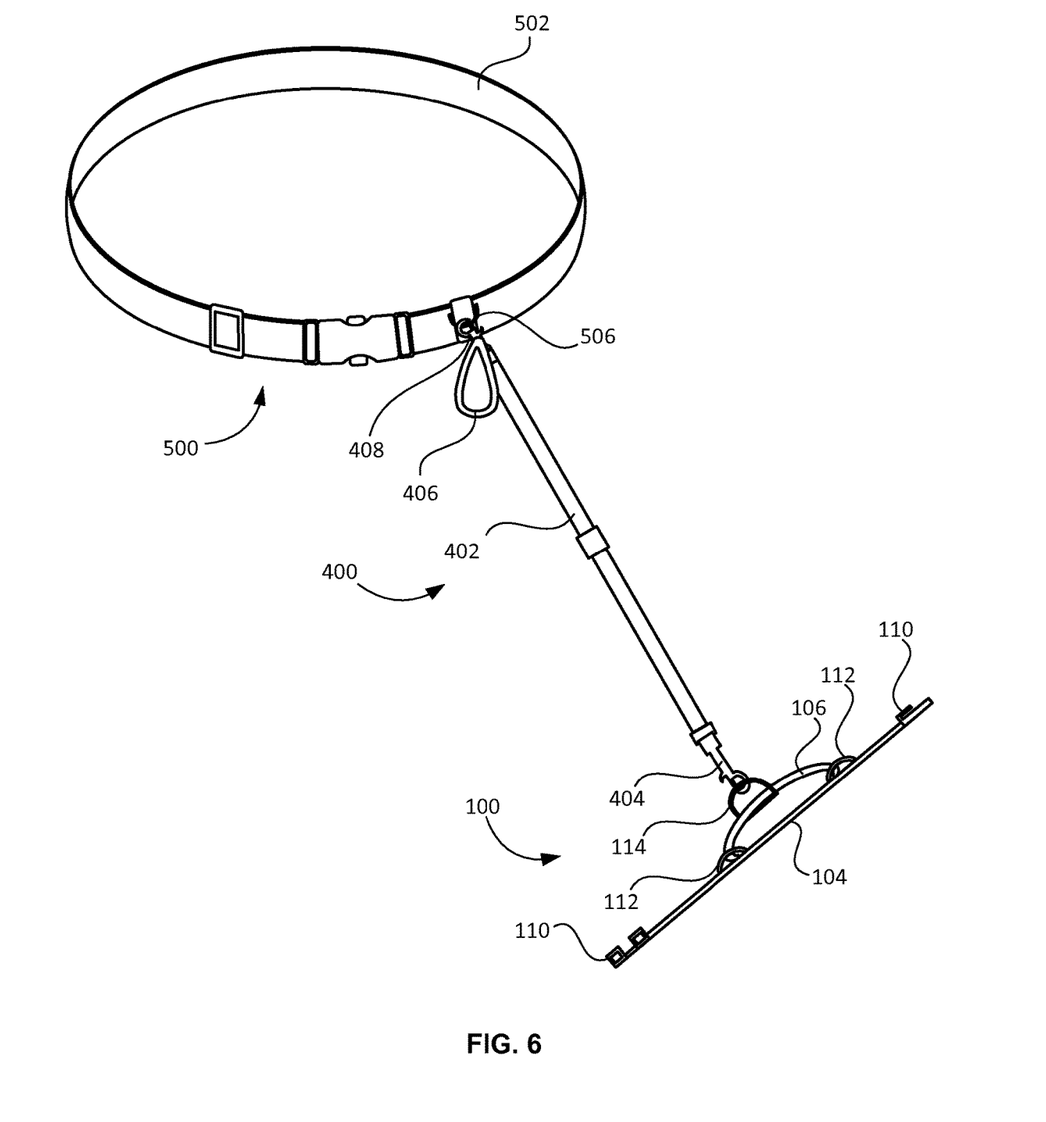
FIG. 6 depicts an exemplary embodiment of an animal training system comprising a collar, leash, and waist strap.

FIG. 6 depicts an animal training system 600 comprising the collar 100, the leash 400, and the waist belt 500. In some embodiments the collar 100, leash 400, and the waist belt 500 can be provided together in a kit. In other embodiments the collar 100, leash 400, and waist belt 500 can be available separately.

As can be seen from FIG. 6, the leash's collar connector 404 can be secured to the leash connector 114 and/or cinch strap 106 of the collar 100. The other end of the leash 400 can be coupled with the waist belt 500. By way of a non-limiting example, the leash's handle connector 408 can be coupled with one of the waist belt's attachment members 506.

In some embodiments and/or situations, the collar 100, leash 400, and waist belt 500 can be used together while training one or more animals. By way of a non-limiting example, an animal trainer can wear the waist belt 500 and put the collar 100 around an animal's neck. The trainer can then attach the leash 400 to the collar 100 to assist in controlling the animal. When desired the trainer can attach the leash 400 to the waist belt 500, such that the animal can be tethered to the trainer and the trainer can have his or her hands free to direct the animal, give the animal treats, and/or perform any other activity. In embodiments in which the waist belt 500 has more than one attachment member 506, a user can attach multiple leashes 400 to different attachment members 506 to assist in controlling multiple animals.

In other embodiments and/or situations, the collar 100, leash 400, and/or waist belt 500 can be used independently or with other components. By way of a non-limiting example, the waist belt 500 can be worn by a user as a belt and the collar 100 and leash 400 can be used while not connected to the waist belt 500. As another non-limiting example, a trainer can use the collar alone without a leash to control the animal by grabbing on to the cinch strap 106.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A collar, comprising:
   a main strap having a length sized to encircle an animal's neck;
   a band coupled with said main strap, said band having a length that is substantially similar to the length of the main strap and a width that is wider than the width of the main strap;
   a first anchor ring coupled with a first fixed point on said main strap;
   a second anchor ring coupled with a second fixed point on said main strap; and
   a cinch strap with a first end coupled with said first anchor ring and a second end coupled with said second anchor ring,
   wherein said cinch strap flexes when pulled away from said main strap and thereby decreases the circumference of the band to gently tighten the band around the animal's neck.

2. The collar of claim 1, further comprising a leash connector coupled with a midpoint of said cinch strap.

3. The collar of claim 2, wherein said leash connector is a D-ring.

4. The collar of claim 1, wherein said main strap is an elongated member with connectors on opposing ends that are configured to be coupled such that said main strap forms a loop.

5. The collar of claim 4, wherein said connectors are male and female side release buckles.

6. The collar of claim 1, wherein the length of said main strap is adjustable.

7. The collar of claim 1, wherein said first anchor ring is a D-ring.

8. The collar of claim 1, wherein said second anchor ring is a D-ring.

9. The collar of claim 1, wherein said cinch strap comprises resilient material, such that when a pulling force that has flexed said cinch strap is removed from said cinch strap, said resilient material returns to a non-flexed state.

10. The collar of claim 1, wherein opposing ends of said band are tapered.

* * * * *